(12) United States Patent
Cantwell et al.

(10) Patent No.: US 10,452,608 B2
(45) Date of Patent: Oct. 22, 2019

(54) LOG-STRUCTURED FILE SYSTEM

(71) Applicant: NETAPP, INC., Sunnyvale, CA (US)

(72) Inventors: Jared Cantwell, Boulder, CO (US); Saxon Parker, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 66 days.

(21) Appl. No.: 15/295,092

(22) Filed: Oct. 17, 2016

(65) Prior Publication Data

US 2018/0107674 A1    Apr. 19, 2018

(51) Int. Cl.
  *G06F 16/11* (2019.01)
  *G06F 3/06* (2006.01)
  *G06F 16/18* (2019.01)

(52) U.S. Cl.
  CPC ............ *G06F 16/128* (2019.01); *G06F 3/064* (2013.01); *G06F 3/0616* (2013.01); *G06F 3/0679* (2013.01); *G06F 3/0688* (2013.01); *G06F 16/1847* (2019.01)

(58) Field of Classification Search
  CPC ......... G06F 17/30088; G06F 17/30182; G06F 17/301218; G06F 17/30327; G06F 17/30091; G06F 17/30185; G06F 2201/84; G06F 3/0641; G06F 3/0643; G06F 3/065; G06F 3/0626; G06F 3/0679; G06F 2212/1056; G06F 2212/202; G06F 2212/214; G06F 12/0238
  See application file for complete search history.

(56) References Cited

U.S. PATENT DOCUMENTS

| | | | |
|---|---|---|---|
| 8,533,410 B1* | 9/2013 | Corbett | G06F 12/00 707/637 |
| 2007/0106706 A1* | 5/2007 | Ahrens | G06F 17/30088 |
| 2013/0080720 A1* | 3/2013 | Nakamura | G06F 17/30088 711/161 |
| 2015/0112939 A1* | 4/2015 | Cantwell | G06F 11/1451 707/646 |
| 2015/0254013 A1* | 9/2015 | Chun | G06F 16/1847 711/103 |
| 2017/0068599 A1* | 3/2017 | Chiu | G06F 11/1407 |

OTHER PUBLICATIONS

Rosenblum M. and J.K. Ousterhout, "The design and implementation of a log-structured file system," ACM Transactions on Computer Systems (TOCS), 1992 vol. 10(1), pp. 26-52.*

(Continued)

*Primary Examiner* — Tracy A Warren
(74) *Attorney, Agent, or Firm* — Cesari and McKenna, LLP (57) ABSTRACT

Systems, computer-readable mediums, and methods are configured to receive a first request to write a first data block to a solid state storage device. A second request is received to associate the first data block with a first snapshot identifier (ID). The first data block is stored on the solid state storage device in response to the first request. The first data block is stored on a first segment of a plurality of physical segments of memory on the solid state storage device. A first data pointer that corresponds to the first snapshot ID is generated in response to the second request. The first data pointer points to the first data block stored on the solid state storage device.

19 Claims, 7 Drawing Sheets

(56) References Cited

OTHER PUBLICATIONS

Wei, Y. and D. Shin, "NAND Flash Storage Device Performance in Linux File System," 6th International Conference on Computer Sciences and Convergence Information Technology (ICCIT), 2011.*
Jones, M. Tim, "Next-generation Linux file systems: NiLFS(2) and eofs," IBM, 2009.*
Konishi, R., Sato, K., and Y. Amagai, "Filesystem Support for Continuous Snapshotting," Ottawa Linux Symposium, 2007.*

* cited by examiner

LOG-STRUCTURED FILE SYSTEM

BACKGROUND

The following description is provided to assist the understanding of the reader. None of the information provided is admitted to be prior art.

Log-structured file systems were created to reduce the disk access times of input/output (I/O) operations. To reduce disk access times, data writes are done sequentially. Data writes can also be queued together, such that multiple data blocks are written sequentially during a single write. As data is written sequentially, overwriting existing data results in both the new data and the old data being stored. To reclaim additional storage space, unused data blocks can be reclaimed through garbage collection.

Based upon the design of a log-structured file system, data contents of a file can be spread across the entire storage. To be able to access a file's data content, a map can be stored at a known, fixed location. This map can include a mapping of where a file's data content resides on the storage. Accordingly, when a file is accessed this map is consulted to determine where to retrieve the file's data contents. Because the map's location is fixed, the map can be accessed by simply reading the storage at the known, fixed location of the map.

SUMMARY

An illustrative system includes one or more electronic processors configured to receive a first request to write a first data block to a solid state storage device. The processors are further configured to receive a second request to associate the first data block with a first snapshot identifier (ID). The processors are further configured to store the first data block on the solid state storage device in response to the first request. The first data block is stored on a first segment of a plurality of physical segments of memory on the solid state storage device. The processors are further configured to generate, in response to the second request, a first data pointer that corresponds to the first snapshot ID. The first data pointer points to the first data block stored on the solid state storage device.

An illustrative method includes receiving, using one or more electronic processors, a first request to write a first data block to a solid state storage device. The method further includes receiving a second request to associate the first data block with a first snapshot identifier (ID). The method further includes storing the first data block on the solid state storage device in response to the first request. The first data block is stored on a first segment of a plurality of physical segments of memory on the solid state storage device. The method further includes generating, in response to the second request, a first data pointer that corresponds to the first snapshot ID. The first data pointer points to the first data block stored on the solid state storage device.

An illustrative non-transitory computer-readable medium has instructions stored thereon, the instructions including instructions to receive a first request to write a first data block to a solid state storage device. The instructions further include instructions to receive a second request to associate the first data block with a first snapshot identifier (ID). The instructions further include instructions to store the first data block on the solid state storage device in response to the first request. The first data block is stored on a first segment of a plurality of physical segments of memory on the solid state storage device. The instructions further include instructions to generate, in response to the second request, a first data pointer that corresponds to the first snapshot ID. The first data pointer points to the first data block stored on the solid state storage device.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION

Described herein are techniques for an enhanced log structured file system that includes per-file de-duplicated snapshots, built in checksums for syncing and backup comparisons, faster checkpointing and crash recovery, thin provisioning, efficient space usage calculations, and instantaneous large operations. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Enhanced Log Structured File System

Figure 1:
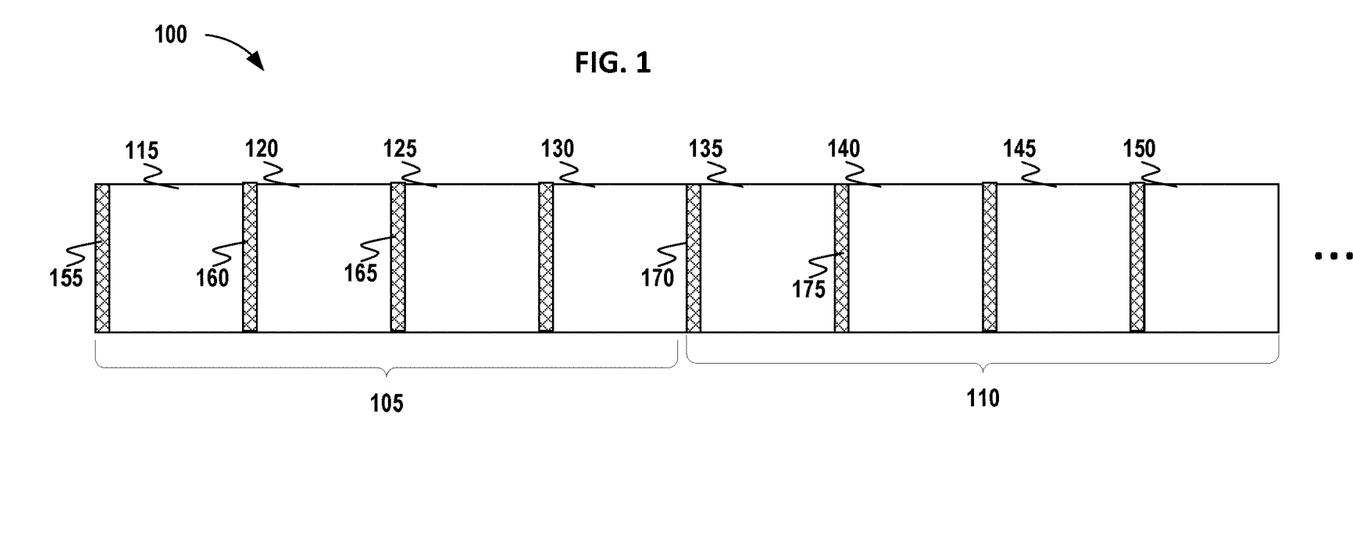
FIG. 1 depicts storage used in a log-structured file system in accordance with an illustrative implementation.

FIG. 1 depicts storage 100 used in a log-structured file system in accordance with an illustrative implementation. In one implementation, the storage 100 is a single solid state drive. The storage 100 is broken down into multiple regions 105 and 110. The size of the regions 105 and 110 can be identical for a single storage. In other embodiments, the sizes for the regions 105 and 110 for files may not be identical. Additionally, the number of regions may vary. The number of regions can be configured when the storage is initially configured. For example, 1 terabyte (TB) storage can include ten 100 gigabyte regions. Alternatively, the same 1 TB storage could be broken into four thousand 250 megabyte regions. The regions 105 and 110 may represent individual files in the file system, or a particular file may include several regions.

Each region 105 and 110 is further divided into segments 115, 120, 125, 130, 135, 140, 145, and 150. Data is written into the appropriate segment or block when data is flushed to storage. To determine where to write data, a write pointer may be used. The write pointer can point to the next position of the storage 100 that will be written to. Note that the structure of the segments and regions of the storage 100 is linear or sequential. That is, data is stored in segments arranged in-line on the storage 100. The storage 100 does not include a hierarchy where certain parts of the storage contains pointers to other levels of the storage. A read pointer may also be used to read data. The read pointer can point to the where the data starts in the storage 100. Because data is written in a sequential manner consecutively through the storage 100, the start of the stored data can be anywhere within the storage. Both the read pointer and the write pointer can also be used during garbage collection or recycling that recaptures storage space of deleted data.

The life of solid state storage can be measured by the number of writes to any one portion of the storage before failure is likely to occur. Accordingly, having a single fixed location that is written to more frequently than other portions of the solid state storage can reduce the lifetime of the solid state storage. To avoid this negative effect, various implementations do not rely upon any single fixed location. Rather, data can be written continuously from a beginning of the storage to the end using write pointers. Once the end of the storage is reached, the file system returns to the beginning of the storage and begins writing. The lack of a fixed location that contains file system data is beneficial in extending the life of the solid state storage, but complicates the startup procedure since the file system must search the storage to determine the write pointer. In addition to writing, the file system disclosed herein can also use such a sequential writing procedure for backup operations such as checkpointing when checkpoint data may be stored in a different storage location.

Figure 2:
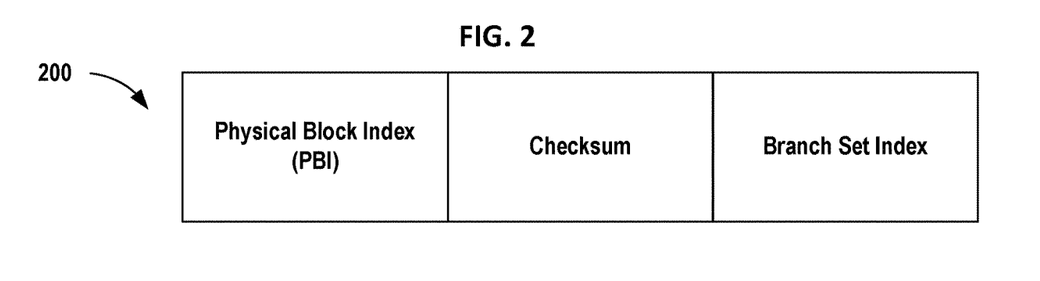
FIG. 2 depicts a representation of a data pointer that points to a data block in accordance with an illustrative implementation.

Each segment of the storage 100 includes at least one data pointer 155, 160, 165, 170, 175, etc. The data pointers uniquely refer to the data stored at the segments 115, 120, 125, 130, 135, 140, 145, and 150. FIG. 2 depicts a representation of a data pointer 200 that points to a data block in accordance with an illustrative implementation. A data pointer similar to the data pointer 200 may be used as the data pointers 155, 160, 165, 170, 175, etc. of FIG. 1. In FIG. 1, the segments 115, 120, 125, 130, 135, 140, 145, and 150 each represent one data block. If the segments 115, 120, 125, 130, 135, 140, 145, and 150 have more than one data block stored therein, each data block has a data pointer.

The data pointer 200 includes three fields: a physical block index (PBI), a checksum, and a branch set index. The PBI corresponds to and refers to a particular physical location or segment on the storage where that data is stored. In other words, the PBI may indicate a physical location of a data block stored on a solid state storage device. For example, a PBI may point to a particular segment of the storage 100 in FIG. 1. In this embodiment, a PBI is unique to a segment on the storage 100. That is, any data block stored at a segment is uniquely pointed to by the PBI of its respective data pointer 200. The data pointer 200 also includes a checksum. A checksum uniquely identifies the data actually stored at the segment the data pointer 200 points to, while the PBI uniquely identifies the physical location of the segment at which that data is stored. The third field of the data pointer 200 is a branch set index. The branch set index includes values that correspond to zero, one, or more snapshot identifiers (IDs). Snapshots may be used to backup data in other locations, sync data between locations, restore a system, and more. The branch set index can refer to zero, one, two, or more snapshots. Thus, whenever a snapshot is used or called, the system can call whatever data, using the data pointers, that are associated with the branch set indexes that refer to the snapshot being used. Snapshotting is further discussed below. By including a branch set index in the data pointer 200, the data pointer 200 references any snapshots that the data pointer 200 is a part of In this way, large amounts of data for multiple snapshots is not stored, which could lead to usage of a lot of memory and a lot of duplicate information stored if snapshots include information relating to the same segments/data blocks.

A branch set index may refer to specific snapshots in a variety of ways. For example, a branch set index can be mapped to a bitset that is overlaid to a vector of a plurality of snapshot IDs. In one embodiment, a branch set index may be four (4) bytes long. Accordingly, each bit of the thirty-two (32) bits in the 4 byte branch set index may refer to a single possible snapshot. Therefore, whenever a bit in the branch set index is high, that particular segment is related to the snapshot corresponding to that bit of the branch set index. A maximum number of possible branch set index values may be set to be greater than the number of total data blocks stored on a solid state storage device, such that the possible number of combinations of snapshot IDs referred to by the branch set indexes does not exceed the number of possible corresponding values in the bitset. A bitset can be created as different branch set index values are referred to as data blocks are written to the segments. That is, bitset values may be assigned on an as-needed basis, based on the branch set index values that appear in a region, group of regions, file, or file system as a whole. For example, once a branch set index is set to refer to a snapshot ID A, the snapshot ID A is added to vector of snapshots, and a bitset value that refers only to snapshot ID A in the vector is assigned to the branch set index value. In this way, whenever snapshot A is performed, called, etc., any data pointer with the branch set index that refers to snapshot ID A can be identified and included in the action for the snapshot. Similarly, if a data pointer's branch set index indicates that it should refer to snapshot IDs B and C, the bitset value that is set to correspond to the branch set index value of the data pointer would refer to both snapshot ID B and snapshot ID C in the vector of snapshot IDs. Snapshotting and other various advantages of the log structured file systems disclosed herein are discussed at greater length below.

Writing Data with Data Pointers

Figure 3:
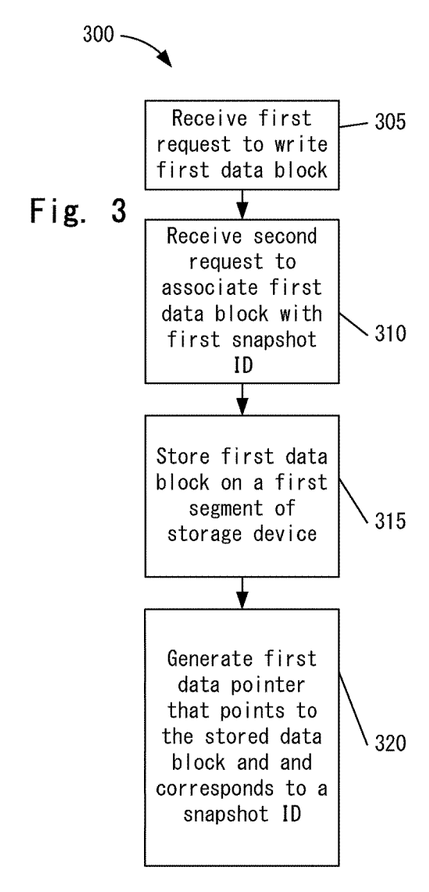
FIG. 3 depicts a flow diagram of a method for writing a data block and a data pointer in accordance with an illustrative implementation.

FIG. 3 depicts a flow diagram of a method 300 for writing a data block and a data pointer in accordance with an illustrative implementation. In alternative embodiments, fewer, additional, and/or different steps may be performed. Also, the use of a flow diagram is not meant to be limiting with respect to the order of steps performed. In an operation 305, a first request to write a first data block to a solid state storage device is received. Such a request may be a request to initiate a file of a file system, write or save new data as requested by a user, save data automatically generated by the system such as metadata, or writing data that is automatically generated based on a predetermined instruction, order, or setting of a user.

In an operation 310, a second request to associate the first data block with a first snapshot identifier (ID) is received. The second request to associate the first data block with a first snapshot ID may be automatically determined. For example, a preexisting setting of the system may automatically associate certain file or data types that are written to automatically be associated with the most recently created snapshot ID or a predetermined number of the most recently created snapshot IDs. Thus, the system can determine which snapshot IDs the first data block are associated with and automatically generate a request to associate the first data block with a first snapshot ID.

In an operation 315, the first data block is stored on the solid state storage device in response to the first request. The first data block is stored on a first segment of a plurality of physical segments of memory on the solid state storage device. For example, in reference to FIG. 1, the system may store the first data block at the segment 115. If other blocks of data are written, they may be stored at the segments 120, 125, 130, etc.

In an operation 320, the system generates, in response to the second request, a first data pointer that corresponds to the first snapshot ID. The first data pointer points to the first data block stored on the solid state storage device. For example, referring to FIGS. 1 and 2, the first data pointer may be the data pointer 155 that is generated and corresponds to the first data block that has been written at the segment 115. The first data block may include various components, such as the PBI, checksum, and branch set index as shown in FIG. 2. In the example of FIG. 2, the branch set index corresponds to the first snapshot ID. In other embodiments, other types of indicators or pointers could be used in a data pointer to refer to a snapshot ID. In other embodiments, the snapshot ID itself may be used in the data pointer. In some embodiments, the first snapshot ID may already be referred to by another data block already stored on the system before or prior to generation of the first data pointer. In such an example, the first data pointer that is generated for the first data block corresponds to a same value of a branch set index stored for the other data block. In other words, the first snapshot ID may already correspond to a second branch set index of a second data pointer that points to a second data block stored on the solid state storage device at a second segment. In other embodiments, there may be no other data blocks that refer to the first snapshot ID. In other words, prior to generation of the first data pointer, the first snapshot ID may not correspond to any branch set index of any data pointer that points to data stored on the solid state storage device.

The data pointer is also stored with the first data block on the solid state storage device at the first segment. In the example of FIGS. 1 and 2, the first data pointer is the data pointer 155 and is stored with the first data block at the first segment 115 in the first region or file 105. In this embodiment, one data block is stored with one data pointer at each of the segments of the storage 100. In other embodiments, segments may include more than one data block, but each data block is also stored with a data pointer. In other embodiments, the data pointers may be stored in a separate location from the data blocks themselves, either on the storage 100 or on another storage device. However, even if data pointers are not stored with their corresponding data blocks, the data blocks are still referred to and correspond with the data pointers because the data pointers include the physical location where the data block is stored (PBI) and a checksum of the actual data from the data block.

Snapshots

Snapshots allow for a system to efficiently store previous versions (or snapshots) of a file system for various purposes, such as backup, data restoration, future backup operations, data syncing, etc. In other words, a snapshot captures a point in time representation or state of a file. Advantageously, when data blocks are written according to the methods disclosed herein, including the method 300 of FIG. 3, snapshots of the system can be deduplicated on a per-file or per-file system basis. In standard file systems, to take a snapshot, a system may have to read and store the states of different files or portions of files at the time of the snapshot. Storing such information may take up significant memory. Reading the files or portions of the files to take the snapshots may utilize significant system resources. If data of a file or files is included or referenced by more than one snapshot, the multiple snapshot files may include redundant data. By storing, in a data pointer, information linking data blocks to one or more snapshot IDs, those drawbacks can be eliminated or significantly reduced. The snapshots are deduplicated because the data pointers can correspond to multiple snapshots without needing to store the data itself or the data pointers more than once. Each time a new snapshot is created, the system does not read all of the data for the snapshot, rather it can change the data pointers to refer to the new snapshot, or change the definition of an existing bitset. For example, if all of the data for snapshot ID A is to be included in a new snapshot ID B, the system could change the way it defines branch set index and bitset values for snapshot ID A such that those same values now refer to the new snapshot ID B. All of this can be done, as disclosed herein, without actually rewriting each of the branch set indexes of all the data pointers that previously referred to snapshot ID A. Specifically, the snapshot ID B is added to the vector that the bitset values point to. The bitset value of the branch set index in the data that previously referred to snapshot ID A is redefined to instead refer to snapshot ID B. In this way, the data pointers (branch set indexes) of the data are never changed. Rather, only how the bitset values and bitset are used to interpret what snapshot IDs the data pointers refer to is adjusted.

The methods disclosed herein also further simplify moves of data blocks. For example, if a data block is moved and is not going to refer to different snapshot(s) after the move, the data block and its pointer can be moved without taking other steps to update the data pointer or other snapshot data. Advantageously, the systems and methods disclosed herein can allow for reduced resources used to create and store snapshots, so that users of the system can ultimately have more snapshots than alternative methods, and those snapshots can be executed faster, both in the storing of snapshots and the recalling of snapshots.

Figure 4:
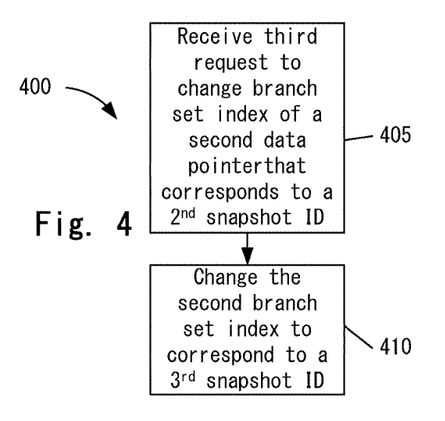
FIG. 4 depicts a flow diagram of a method for changing a data pointer for an existing data block in accordance with an illustrative implementation.

FIG. 4 depicts a flow diagram of a method 400 for changing a data pointer for an existing data block in accordance with an illustrative implementation. In alternative embodiments, fewer, additional, and/or different steps may be performed. Also, the use of a flow diagram is not meant to be limiting with respect to the order of steps performed. In an operation 405, a request is received to change a branch set index of a data pointer. In this embodiment, a data block already is stored on a storage system but the data pointer is being changed to refer to a different snapshot ID (or IDs). In this embodiment, a branch set index such as that shown in FIG. 2 is used. In other words, the data pointer points to a data block stored at a segment of a plurality of physical segments of memory on the solid state storage device, and the branch set index corresponds to a snapshot ID (or IDs).

In an operation 410, the branch set index is changed, in response to the request to correspond to the new/changed snapshot ID (or IDs). As one example, a first data block has a data pointer with a branch set index that refers to both snapshot ID A and snapshot ID B. The system receives a write for a second data block that is supposed to replace the first data block, but only with respect to snapshot ID A. That is, the first data block will continue to refer to the snapshot ID B after the write and the second data block will refer to the snapshot ID A after the write. In this scenario, the data pointer branch set index value of the first data block is changed from referring to snapshot IDs A and B to just referring to snapshot ID B. If a different data block already referred to just snapshot ID B, then it would have the same branch set index value after the write, and a new bitset value need not be defined. If this is the first instance in the file system of a data block referring to just the snapshot ID B, then a new bitset would be defined that referred to only the snapshot ID B in the vector. The second data block is written with a data pointer branch set index value that only refers to snapshot ID A. Similarly, if a different data block pointer previously referred only to the snapshot ID A, then the second data block's pointer would be set to have a similar branch index value. In this way, the snapshots stay deduplicated, use less memory to store, and are more quickly created and used.

The systems and methods disclosed herein also include a secondary structure to track the bitsets that are being used (i.e., track bitsets that are actually being referred to by data pointers to refer to active snapshots). If a bitset value is not actively being referred to any branch set indexes on a system, the bitset value can be reassigned to different snapshot values according to a newly written data block(s) and/or newly requested snapshot(s). Because the relationship between the branch set index values and how snapshot IDs are arranged in the vector (and therefore what bitset value correlates to a given branch set index value) are arbitrary, those relationships between branch set indexes, bitset values, and the vector can be built or re-built on every startup of the system and redefined as needed. Accordingly, data can be instantaneously (or near instantaneously) snapshotted as the data is written to a storage medium.

The deduplicated snapshots also have advantages with respect to syncing and backup. For example, a snapshot may be made of an entire file and compared to a backup of the file on another memory. By comparing the two, the system can easily determine what changes have been made and what in the backup might need to be updated to continue to mirror the file. In various embodiments, hash trees (e.g., Merkel tree, etc.) may be used to perform a more efficient version of this comparison. Use of such trees for comparison of data is discussed generally in U.S. Pat. No. 9,372,757, granted on Jun. 21, 2016, which is incorporated herein by reference in its entirety. However, as disclosed herein, the method for assembling/building the hash trees using the enhanced log structured file system disclosed herein offers certain advantages.

Figure 5:
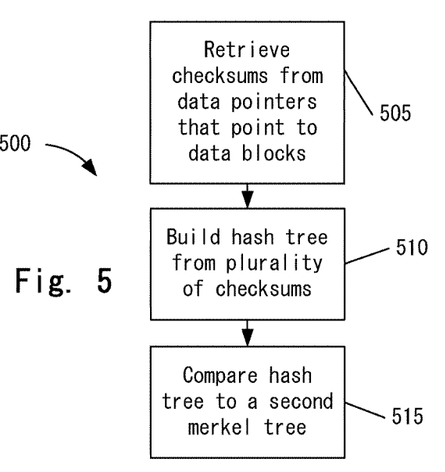
FIG. 5 depicts a flow diagram of a method for comparing hash trees for different snapshots in accordance with an illustrative implementation.

FIG. 5 depicts a flow diagram of a method 500 for comparing hash trees for different snapshots in accordance with an illustrative implementation. In alternative embodiments, fewer, additional, and/or different steps may be performed. Also, the use of a flow diagram is not meant to be limiting with respect to the order of steps performed. In an operation 505, the system retrieves a plurality of checksums from a plurality of data pointers that point to data blocks on a solid state storage device. Each of the plurality of data pointers comprises a branch set index that corresponds to a snapshot ID. In other words, the system is able to call the checksum data from all of the data pointers that are associated with a particular snapshot ID. In an alternative embodiment, instead of calling checksum data based on a snapshot ID, the system may call all checksum data for a region, a file, a group of files, or a whole storage system. Since the checksum data represents a hashed, unique identification of the data stored in each data block, a separate hashing step is not performed in various embodiments.

In an operation 510, the system builds a hash tree from the plurality of checksums. Although the hash tree or aggregated checksum data is called a hash tree, it may not be in a "tree" shape. For example, the hash tree may merely be checksum data in a sequential or linear structure as it was read off of the storage.

In an operation 515, the system compares the first assembled hash tree to a second hash tree. The second hash tree may be a backup of the data that the first hash tree was assembled based on. The second hash tree could also be assembled based on a second snapshot ID, such that the data associated with the first snapshot ID is compared to the data associated with the second snapshot ID.

Accordingly, using the built in checksum data already stored in the data pointers of the data blocks in a storage system such as that shown in FIGS. 1 and 2, hash trees for syncing, backup, comparisons, etc. can be assembled quickly and easily, without using excessive processing power to gather data or perform hashes.

Checkpointing

The enhanced log structure file system disclosed herein also offers improved and advantageous checkpointing. The systems and methods disclosed herein provide checkpointing and replay from those checkpoints for faster crash recovery or startup. Checkpointing includes recording an in-memory state of a file system on a storage to speed up recovery time in the event of a crash or when the storage system is starting up. Checkpointing speeds up recovery time during a crash/start-up time since checkpoints do not require scanning an entire storage drive to implement a replay. Replay includes building the in-memory data structures used to access files stored in the storage system. In particular, the methods and systems disclosed herein also allow for recovery and checkpointing that does not necessitate each part of a file system to be rebuilt during a replay. The systems and methods herein are able to efficiently track which parts of a file have changed, been previously checkpointed, etc., such that parts of a file that are not needed to be rebuilt for a recovery are not rebuilt. Such processes speed up recovery time. Further, the system can perform checkpointing in the background to individual files or regions of files, reducing the impact to performance of a system based on active checkpointing.

Figure 6:
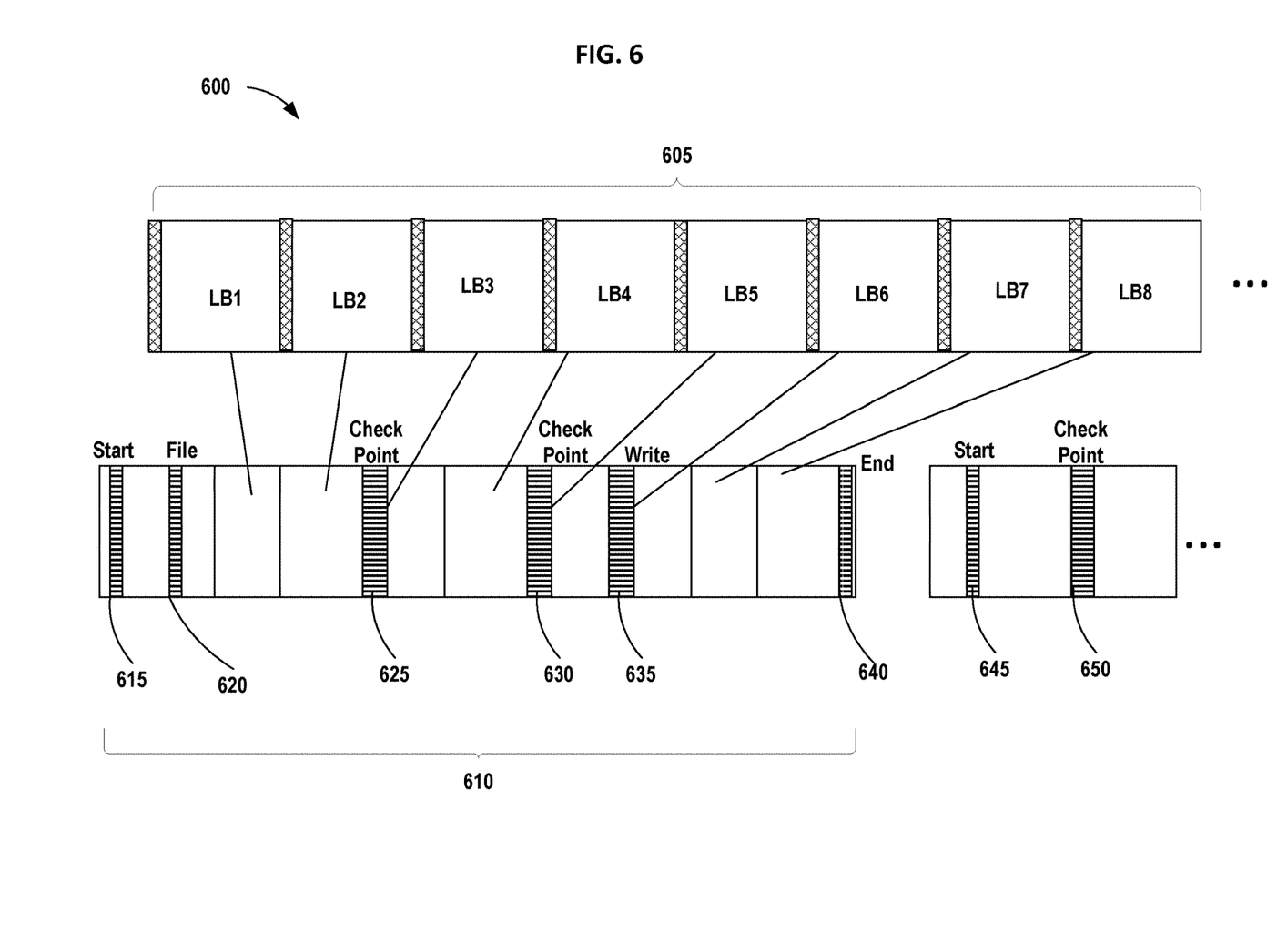
FIG. 6 depicts storage used in a log-structured file system with checkpointing in accordance with an illustrative implementation.

FIG. 6 depicts storage used in a log-structured file system with checkpointing in accordance with an illustrative implementation. The file system includes a storage 600, upon which various files are stored. The files include a region 605, which may be a file, more than one file, or a portion of a file. The system can split up or aggregate files in different ways for different embodiments. Here, the region 605 is a portion of a file and has 8 segments, associated with logical block indexes (LBIs) that denote the segments position in the storage 600. A region after the region 605 may begin with LB9, after the last segment LB8. Further, each segment here corresponds to a single data block.

Below the region 605 is storage for checkpoint data 610. Here, the in-memory state of the region 605 (LB1 to LB8) can be recorded into the checkpoint data 610 for checkpointing, recovery, etc. As noted by lines, each LBI is associated with a section of the checkpoint data 610. As will be discussed further below with respect to FIG. 7, each LBI includes a checkpoint data pointer that includes information about the data stored in the file region 605 and other information useful for checkpointing and recovery. The checkpoint data pointer is written when the LBIs are checkpointed. The LBIs are checkpointed (in-state memory recorded) as the checkpoint data 610 in a sequential manner, starting with LB1 and ending with LB8.

Figure 7:
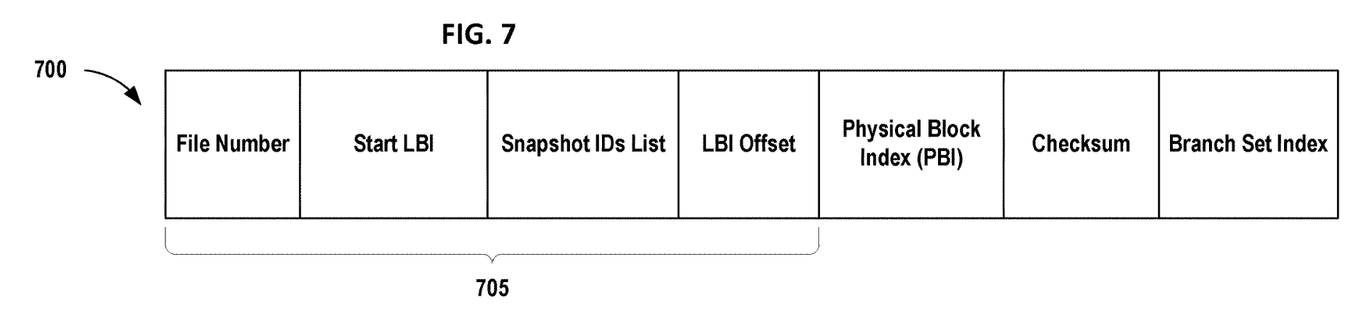
FIG. 7 depicts a representation of a checkpoint marker in accordance with an illustrative implementation.
Figure 9:
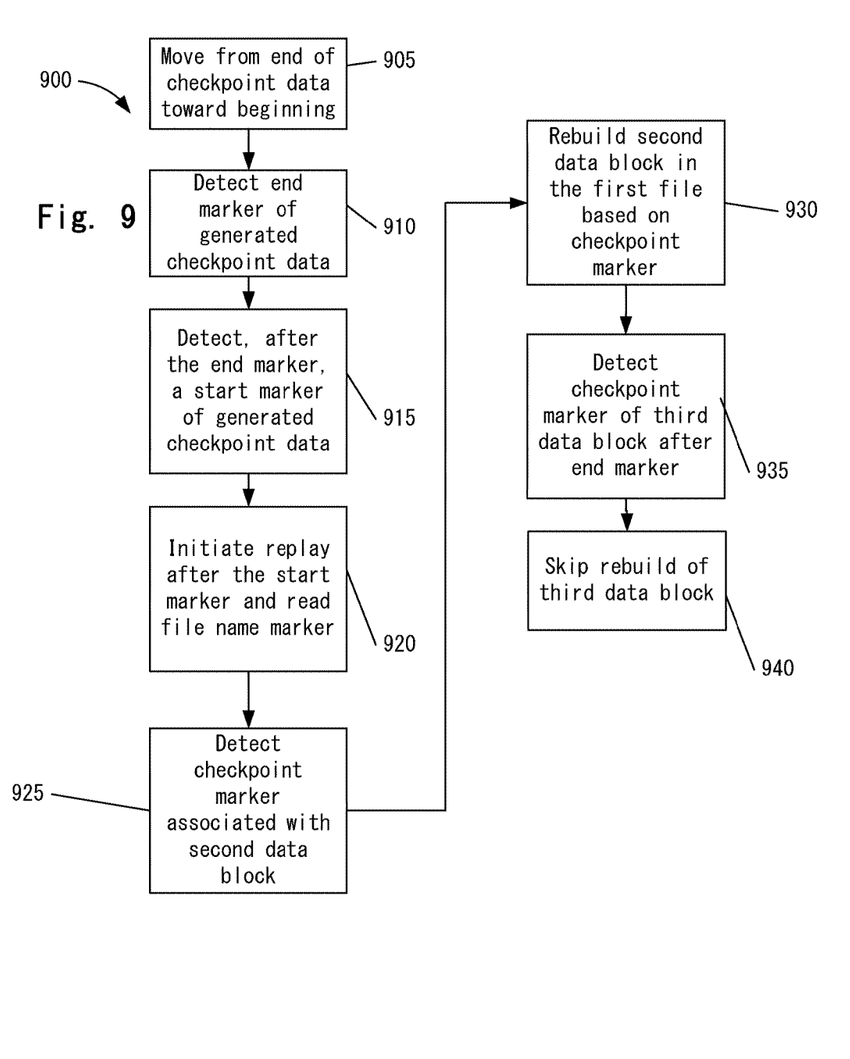
FIG. 9 depicts a flow diagram of a method for replaying based on checkpoints in accordance with an illustrative implementation.

The checkpoint data also includes various markers, which will be discussed at greater length below. When a checkpoint of the region 605 is started, inputs and outputs for the region 605 are suspended to ensure that the checkpointing is done accurately. Accordingly, splitting files into regions during checkpointing keeps more files and/or portions of files active for input/output during checkpointing. At the beginning of checkpointing, a start marker 615 is saved in the checkpoint data 610. After the start marker 615, a checkpoint file marker 620 is saved that indicates which file the region 605 is a part of and indicates that the information to follow will be checkpoint data. In contrast, the system would know not to expect checkpoint data (or replay from that subsequent data) if the marker 620 was a new data marker as opposed to a checkpoint file marker. Here, the checkpoint data with respect to LB1 and LB2 is not associated with any type of marker in the checkpoint data 610. During checkpointing, this may happen if LB1 and LB2 do not have data associated with it (i.e., no data is stored at LB1 and LB2). In this way, during a replay, LB1 and LB2 would not be rebuilt into the region 605 because there is no information in the checkpoint data 610 to replay LB1 and LB2 into the region 605. Similarly, the checkpoint data 610 associated with LB4, LB7, and LB8 also have no checkpoint marker and may be treated similarly to LB1 and LB2 during replay.

When a region is checkpointed, the system checkpoints (i.e., records the in-memory state of) each of the LBIs that have data stored therein into the checkpoint data 610. For example, the checkpoint marker 625 records information about LB3 into the checkpoint data 610 so that the data of LB3 can be replayed later. The checkpoint marker 625 includes elements discussed below with respect to FIG. 7. When the system sees the checkpoint marker 625 during a replay, the data associated with LB3 as checkpointed can be replayed. Similarly, a checkpoint marker 630 with respect to LB5 is stored in the checkpoint data 610 during checkpointing. A write marker 635 shows when a request to write, edit, or delete an LBI (here, LB6) has been received by the system but not yet executed. For example, a request may be made by a user to write data to LB6. When the request is received, the write marker 635 is stored in the checkpoint data 610 to indicate that the request has been received and has not been executed yet. Therefore, if the write marker 635 is encountered during a checkpointing process, the system can execute/prioritize the write to LB6, and then can checkpoint LB6 after the write to LB6 is complete, creating a checkpoint marker. If a write marker is encountered during a replay, the system can skip that marker, because the data already in the region 605 at that LBI (here LB6) is ein the state is should be for a replay, as the write request was never executed before the replay. The checkpoint data 610 also includes an end marker 640, which is stored where a checkpointing of a region (here the region 605) ends. This indicates that the checkpointing of the region is complete. Accordingly, during a replay, LBIs with checkpoint data between a start and end marker are replayed (i.e., the system replays data corresponding to regions that have a completed checkpoint). As discussed in greater detail below, particularly with respect to FIG. 9, checkpoint markers that are found outside of a start and end marker pair are not replayed during a replay.

FIG. 7 depicts a representation of a checkpoint marker 700 in accordance with an illustrative implementation. The checkpoint marker 700 includes data that is included in data pointers discussed above, including the data pointer 200 that includes a PBI, checksum, and branch set index.

Additionally, the checkpoint marker 700 includes checkpoint data 705. The checkpoint data 705 includes a file number, a start LBI (logical block index), a snapshot IDs list, and an LBI offset value. The file number is included so that the system knows when replaying which file to replay to. This may be valuable where, for example, different files or regions of memory use a similar LBI and/or PBI numbering scheme that start at zero or one. In other words, an LB3 of file A would get replayed into file A, while an LB3 of file B would get replayed into file B. This is made possible by including in the checkpoint data the file number. Other configurations of checkpoint data are possible, and FIG. 7 shows one example. For example, file numbers may not be used if every single physical block on a memory system is associated with a unique identifier or index.

The checkpoint data 705 also includes a start LBI. The start LBI indicates where in a file the region starts. As mentioned above, a single file may be numbered sequentially with respect to its LBIs. Accordingly, if the file is split up into different regions for checkpointing, the checkpoint data includes information on where a region starts at the start LBI. For example, referring to FIG. 6, the checkpoint data 610 has a start LBI of LB1. Since the region 605 (corresponding to the checkpoint data 610) goes until LBB, a subsequent region may have a start LBI of LB9.

The snapshot IDs list of the checkpoint data 705 includes a list of each of the snapshot IDs for the region (e.g., the region 605) at the time when the checkpointing was performed. In this way, when checkpointing, the system can know which snapshots are impacted or invoked by a region that is being checkpointed. Additionally, since this list is included in the checkpoint data marker, a region that is being checkpointed should have any changes to the snapshots of the region suspended so that a list of snapshot IDs is not inaccurate based on a change to the snapshots while a checkpoint is in process. This list of snapshot IDs is maintained at least because the bitset used may not be persistent, but the list of snapshot IDs stored as checkpoint data is persistent, thus surviving a failure and replay. Similarly, since writes to data in the region often impact the snapshots, writes to the region's data may also be suspended. The checkpoint data 705 also includes an LBI offset value. This is the distance of LBIs from the start LBI that the data block currently being checkpointed is. Although, different ways of specifying the specific LBI that is checkpointed for ease of replay is contemplated, this particular embodiment uses less memory overall than at least some other embodiments. With this LBI offset and the start LBI, the system knows exactly where to replay the data back into the file.

Figure 8:
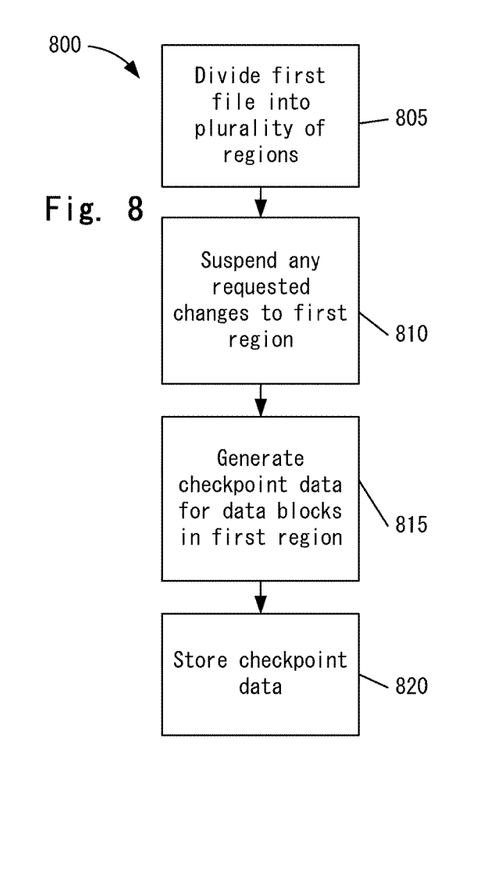
FIG. 8 depicts a flow diagram of a method for checkpointing in accordance with an illustrative implementation.

FIG. 8 depicts a flow diagram of a method 800 for checkpointing in accordance with an illustrative implementation. In alternative embodiments, fewer, additional, and/or different steps may be performed. Also, the use of a flow diagram is not meant to be limiting with respect to the order of steps performed. In an operation 805, the system divides a first file that is part of a file system into a plurality of regions. Each of the regions includes a plurality of segments of data, such as shown in FIG. 6 with the region 605. This division is a logical division for how to checkpoint the data. The data may not be actually divided in any physically noticeable way at the segments on the storage.

In an operation 810, the system suspends any requested changes to the first region. This ensures that no changes are made to the region that is in the process of being checkpointed. If a requested change is received for the region being checkpointed, the system can queue that request to be executed after the checkpoint for that region is completed. The system also suspends requested changes to the region being checkpointed because a list of all snapshot IDs that a region refers to is maintained in a checkpoint marker as shown in FIG. 7. If snapshots could be changed based on writes (e.g., in the method 300 or 400), then the lists maintained as part of the checkpoint data may not be accurate. Thus, the requested changes for a region are suspended during checkpointing.

In an operation 815, the system generates the checkpoint data for a plurality of data blocks of the region. As shown in the example of FIG. 6, the checkpoint data includes a plurality of checkpoint data markers that point to the plurality of data blocks that can be used to replay a file or file system.

In an operation 820, the system stores the checkpoint data. In this embodiment, the checkpoint data is stored on a separate storage from the file system itself. In this way, a failure of the file system, or the storage on which the file system is stored, prevents a replay from occurring. However, in other embodiments, the checkpoint data may be stored on the same storage as the file system, e.g., in another region.

FIG. 9 depicts a flow diagram of a method 900 for replaying based on checkpoints in accordance with an illustrative implementation. In alternative embodiments, fewer, additional, and/or different steps may be performed. Also, the use of a flow diagram is not meant to be limiting with respect to the order of steps performed. The system can initiate a replay based on the checkpoint data for a variety of reasons (e.g., a failure). In an operation 905, the system reads the checkpoint data, moving from an end of the checkpoint data for the first file toward a beginning of the checkpoint data for the first file to detect markers in the checkpoint data. In particular, the system is looking for an end marker followed by a start marker. If the system finds these two markers in that order, the system knows there was a completed checkpoint of a region and that any checkpoint data for that region can be found between those start and end markers. For example, if starting on the right of FIG. 6, the system may first find a start marker 645. However, the start marker 645 was not preceded by an end marker so a replay is not started from the start marker 645.

In an operation 910, the system detects an end marker that indicates an end point of generated checkpoint data for the first region. For example, when replaying using the checkpoint data of FIG. 6, the system may detect or read the end marker 640 that indicates an end point of the checkpoint data 610.

In an operation 915, the system detects, after detecting the end marker, a start marker that indicates a start point of generated checkpoint data for the first region. In the example of FIG. 6, the start marker 615 is detected after the end marker 640 is detected, indicating that in between those two markers is valid checkpoint data 610 that may be used for a replay. The system also suspends snapshot creation, changes to snapshot IDs, writes, trims, and other operations of the first file during the replay. In this way, the system can complete the replay and get into a consistent state before the lifting the suspensions and resuming execution of snapshot creation, changes to snapshot IDs, writes, trims, and other operations.

In an operation 920, the system initiates the replay based on the checkpoint data by reading a file name marker after detecting the start marker. In the example of FIG. 6, the file name marker 620 is read at the operation 920. This file name marker indicates a file name of the first file and/or a location in the memory on a storage device where the checkpoint data should be replayed to. The file name marker also indicates that the checkpoint data 610 was actually created as a checkpoint. Since other types of data may be stored on a storage used for checkpointing, the file name marker indicates that the checkpoint data 610 is in fact checkpoint data. Accordingly, the replay can be initiated using the checkpoint data at the operation 920.

In an operation 925, the system detects a checkpoint data marker associated with a data block in the checkpoint data between the start marker and the end marker. In the example of FIG. 6, the system may detect the checkpoint marker 625 and/or 630. Those checkpoint markers may include the data discussed above with respect to FIG. 7.

In an operation 930, the system rebuilds the data block in the file system according to data in the checkpoint data marker and the file name marker. In an operation 935, the system may detect a checkpoint data pointer associated checkpoint data after the end marker. As discussed above, since a checkpoint data pointer, such as the checkpoint data pointer 650 of FIG. 6, is not in between a start and end marker, that data will be ignored or skipped during the skipping the rebuild/replay of the first region or file. This can occur where a crash or failure happens in the middle of a checkpointing operation.

Figure 10:
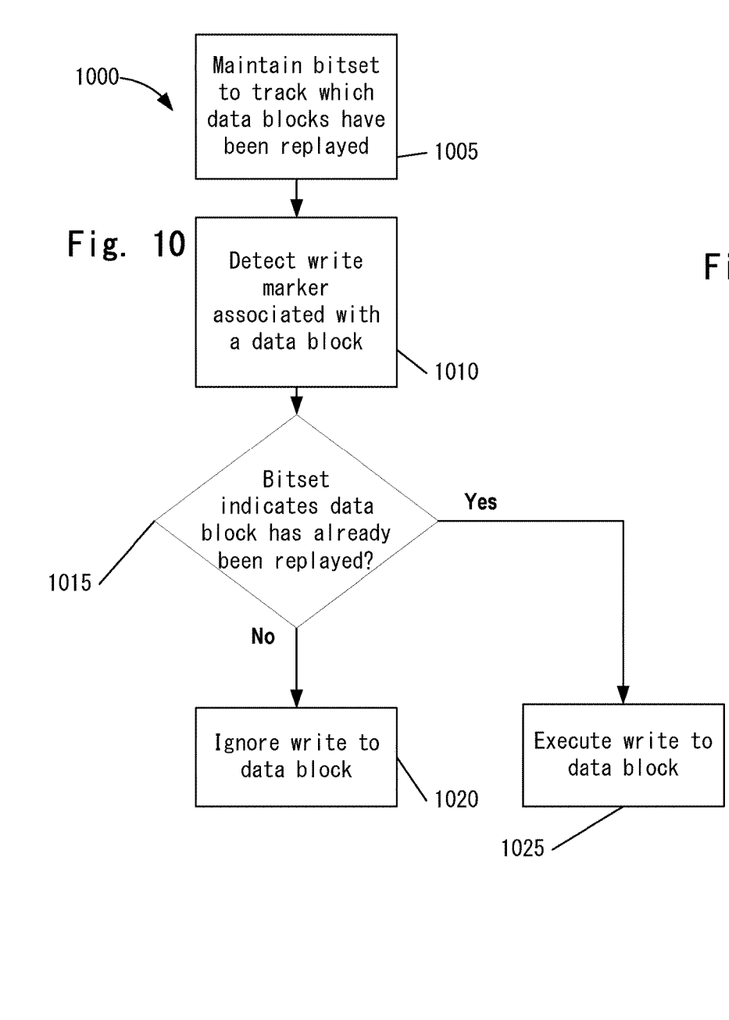
FIG. 10 depicts a flow diagram of a method tracking checkpointing progress in accordance with an illustrative implementation.

FIG. 10 depicts a flow diagram of a method 1000 tracking checkpointing progress in accordance with an illustrative implementation. In alternative embodiments, fewer, additional, and/or different steps may be performed. Also, the use of a flow diagram is not meant to be limiting with respect to the order of steps performed. In an operation 1005, the system maintains a bitset during replay to track which data blocks of the first region have been replayed. For example, a bit for each segment or data block may be set to zero to indicate that a segment or block has not been replayed, and a bit for each data block that has been replayed may be set to one. Once an entire region is replayed, the bitset will have all ones indicating that each segment/data block of the region has been replayed. In some instances, a write request is received or a write marker indicating a write request is detected, indicating that the system is trying to perform a write to data that is currently being replayed.

In an operation 1010, the system detects a write marker associated with a data block of a region being replayed. The system can refer to the bitset to determine whether the data block associated with the write request has already been replayed based on the checkpoint data.

At an operation 1015, the system determines if the bitset indicates that the data block that the write request was received for has already been replayed. When the bitset indicates that the data block has already been replayed, the system executes a write to the data block in accordance with the write request at an operation 1025. If the block has already been replayed, a write can be properly executed, because the data block will be in its expected state after being replayed. In other words, when a write is generated, that write may be generated and requested based on assumptions of the present state of that data block. If the data block has not been replayed yet, that state may not exist. Accordingly, to prevent errors, the system executes write requests during a replay by ensuring that the data block has already been replayed before executing the write. When the bitset indicates that the second data block has not been replayed, the system ignores the write request to the data block at an operation 1020. Here, the data block has not yet been replayed, so the write to the data block is, at least temporarily, ignored. The write can be queued and executed after the block is replayed.

Instantaneous Large Operations

The systems and methods disclosed herein can also perform large operations instantaneously, at least from the perspective of a user. For example, if a trim is ordered, the system creates a background job to trim a file, such that to a user/client it appears immediately that the trim is done. However, the actual process of executing the trim is ongoing over time. As disclosed in more detail below with respect to FIG. 11, trims and other operations can then be aggregated with respect to files, regions, segments, and data blocks on a storage. In this way, if a specific data block has pending operations with respect to, for example, three separate commands/requests from a user/client, those three operations can be aggregated such that as the system steps through the storage (e.g., the storage 100 of FIG. 1) any aggregated operations for a particular data block or segment can be performed at once. Thus, those three aggregated operations can be performed at one time instead of during three separate runs trying to execute the three different operations. This is advantageous in several ways. It leads to faster operations being executed overall. It leads to shorter times that individual segments or files are inaccessible due to operations being performed. It also leads to fewer times the system has to crawl through an entire storage such as the storage 100 to execute multiple large operations.

Furthermore, this process allows for the instantaneous (at least from the user/client perspective) large operations. The system aggregates and queues up the operations on a per file, region, segment, and/or data block level. If a write, trim, or other operation is received for a file, region, segment, and/or data block, the system can check the queue to determine if there are any outstanding operations for that file, region, segment, and/or data block. If there are, the system can prioritize and perform those operations right away so that the operation from the client/user can also be executed right away, maintaining the impression on the client/user that the aggregated large operations were already completed when the write, trim, or other operation was requested (even if those large operations were requested long before a subsequent request was received). This aggregated queue may maintain trims on an LBI level basis on an outstanding trim list. An outstanding trim list may, for example, be maintained on a per-file basis. In other embodiments, the list may be maintained on a per-region, per-file system, or per-storage basis.

Figure 11:
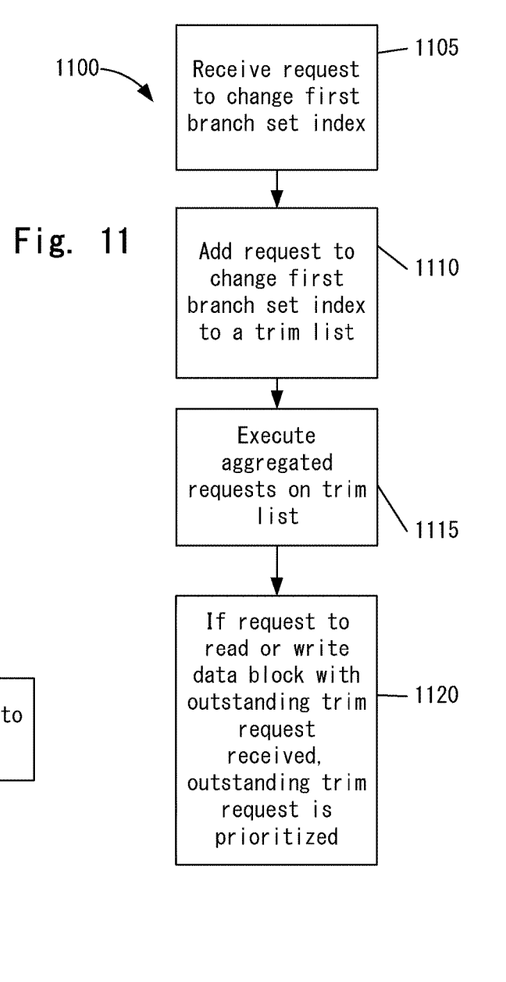
FIG. 11 depicts a flow diagram of a method for efficient trimming operations in accordance with an illustrative implementation.

FIG. 11 depicts a flow diagram of a method 1100 for efficient trimming operations in accordance with an illustrative implementation. In an operation 1105, the system receives a request to change a branch set index that corresponds to a first snapshot ID of a data pointer for a data block. In an operation 1110, the system adds the request to change the branch set index to a trim list. In an operation 1115, the system executes aggregated requests on the trim list on a per LBI basis. If a request to read or write a data block (LBI) with an outstanding trim request is received, the outstanding trim request is prioritized and completed before the read or write is executed.

Efficient Space Usage Calculations

The systems and methods disclosed herein also provide advantages in determining how much space is being utilized on a storage. Advantageously, since a data pointer is stored with each data block or LBI in the systems disclosed herein, the system may quickly determine how much memory is being used by counting how many data pointers exist on the memory. This is possible because each data block is the same size, so the amount of memory used could be calculated by multiplying the data block size by the number of data pointers. In other words, the system can count a plurality of data pointers on a solid state storage device to determine how much space is currently used on the solid state storage device. Each of the plurality of the data pointers points to one of a plurality of data blocks, and each of the plurality of data blocks is the same size.

In another embodiment, a storage system may have data blocks with data pointers that no longer refer to any snapshots. In some contexts, this data may no longer be of any use within the system. In other words, a lack of reference to any snapshot means the data is no longer used by the system. In other embodiments, data no longer in use may be indicated by a pointer or marker. Accordingly, in these embodiments, even though data blocks and pointers may be present, the system may not count those data pointers when performing a space usage calculation. This is because those data blocks are no longer in use and may be overwritten for new data (i.e., even though something is stored there, there is room to write data there).

In other embodiments, the branch set index values may be utilized to determine amounts of data on a storage that are associated with a specific snapshot ID or combination of snapshot IDs. For example, if a system has blocks that refer to snapshot ID A only, blocks that refer to snapshot ID B only, and blocks that refer to both snapshot IDs A and B. Since each of those three groups of blocks have different branch set indexes, any combination of those three groups can be calculated in a space usage calculation. As just examples, the system could calculate: how much space is being used that only refers to ID A, how much space is being used that refers to ID A at all (blocks of only A and blocks of A and B), how much space is being used by blocks that refer to A or B but not A and B, etc.

Such functionalities are valuable for easily calculating how much space on a storage system is being used. Advantageously, if data needs to be moved to another storage, these efficient space usage calculations can be used to help make efficient calculations to inform decisions on what to move. Using the example from the preceding paragraph, the system may want to move one of snapshot A or snapshot B to another storage to free space on the existing storage. The data blocks that refer to both A and B may, in this case, be immaterial to deciding which snapshot to move because that data will have to both stay on the existing storage and be duplicated onto the other storage if all the data associated with one of the snapshots is moved. However, the system can make the efficient usage calculation for data pointers that refer to A and B and compare the two. Whichever is larger could be moved to result in more space being created on the storage. These type of data calculations may also be used to determine how much data is being used by a client, user, or customer.

Additionally, a counter may be used to keep a real time count of data pointers for a whole storage system, file, and/or region. For example, if a counter is kept for a solid state storage drive, the counter may be updated every time a new data block is written. In this way, when a request for usage is made, the system can quickly call the counter value as opposed to having to calculate space usage on demand.

Garbage Collection

As described above, the described log structured file system writes data continuously from the beginning of a storage to the end of the storage. As data is deleted, an indication that the data has been deleted is written, but the actual data can remain on the disk. Eventually, this deleted data can be recaptured so that additional data can be written to storage. This can be accomplished with a process referred to as garbage collection or recycling. Recycling can occur at various times.

The systems and methods disclosed herein provide advantages for garbage collection. A garbage collection operation can walk the storage (e.g., the storage 100 of FIG. 1) and look for data pointers that point to a PBI that no longer points to data at that PBI. If there is not data there, or the checksum of the data pointer does not match what is stored at the PBI, the data pointer may be disposed of and any data at the PBI may be written over.

In another example, if a branch set index is set to zero such that no snapshots refer to it anymore, that data may also be deleted. This can also occur immediately, as the system would know when it sets a branch set index to zero.

Illustrative Computer System

Figure 12:
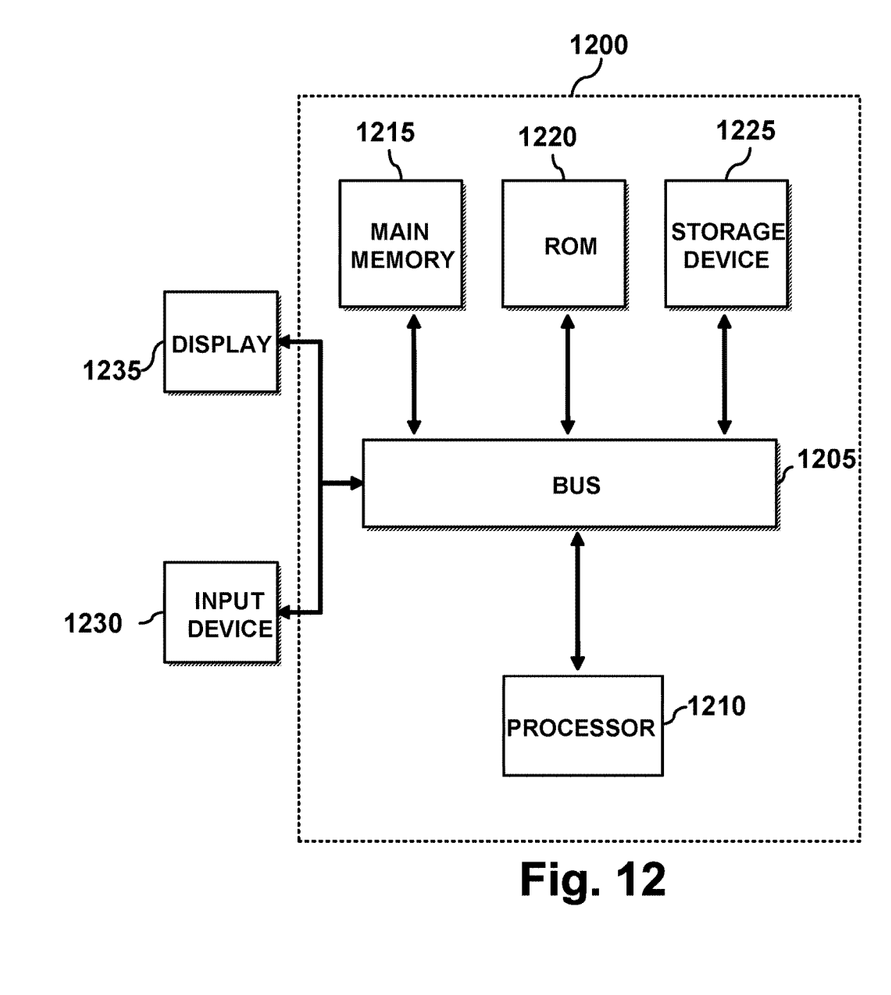
FIG. 12 depicts a block diagram of a computer system in accordance with an illustrative implementation.

FIG. 12 is a block diagram of a computer system 1200 in accordance with an illustrative implementation. The computing system 1200 includes a bus 1205 or other communication component for communicating information and a processor 1210 or processing circuit coupled to the bus 1205 for processing information. The computing system 1200 can also include one or more processors 1210 or processing circuits coupled to the bus for processing information. The computing system 1200 also includes main memory 1205, such as a random access memory (RAM) or other dynamic storage device, coupled to the bus 1205 for storing information, and instructions to be executed by the processor 1210. Main memory 1215 can also be used for storing position information, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235, such as a liquid crystal display, or active matrix display, for displaying information to a user. An input device 1230, such as a keyboard including alphanumeric and other keys, may be coupled to the bus 1205 for communicating information and command selections to the processor 1210. In another implementation, the input device 1230 has a touch screen display 1235. The input device 1230 can include a cursor control, such as a mouse, a trackball, or cursor direction keys, for communicating direction information and command selections to the processor 1210 and for controlling cursor movement on the display 1235.

According to various implementations, the processes described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In alternative implementations, hard-wired circuitry may be used in place of or in combination with software instructions to effect illustrative implementations. Thus, implementations are not limited to any specific combination of hardware circuitry and software.

Although an example computing system has been described in FIG. 12, implementations described in this specification can be implemented in other types of digital electronic circuitry, or in computer software, firmware, or hardware, including the structures disclosed in this specification and their structural equivalents, or in combinations of one or more of them.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system comprising:
    a processor coupled to a memory; and
    a solid state storage device (SSD) coupled to the processor, the memory having instructions stored thereon to cause the system to,
        generate a first data pointer as metadata having a first physical location index, a first checksum, and a first bitset, based on a first request to write a first data block to the SSD, wherein the first checksum corresponds to the first data block;
        set a bit in the first bitset that maps to a first snapshot identifier included within a vector of snapshot identifiers, wherein the first snapshot identifier is associated with the first data block;
        store the first data pointer sequentially with the first data block in a first segment of a plurality of physical segments of the SSD, wherein the first physical location index is unique to the first segment; and
        store the vector of snapshot identifiers in a checkpoint marker on the SSD during a checkpoint of the segment.

2. The system of claim 1, wherein the memory includes further instructions stored thereon to cause the system to:
    build a first hash tree corresponding to a first dataset from the first checksum and additional checksums included in additional data pointers in the plurality of physical segments; and
    compare the first hash tree to a second hash tree to determine differences between the first dataset and a second dataset.

3. The system of claim 1, wherein the memory includes further instructions stored thereon to cause the system to:
    generate a second data pointer having a second physical location index, a second checksum, and a second bitset, based on a subsequent request to write a second data block to the SSD, wherein the second checksum corresponds to the second data block;
    set a bit in the second bitset that maps a second snapshot identifier included within a vector of snapshot identifiers, wherein the first snapshot identifier is associated with the second data block; and
    store the second data pointer sequentially with the second data block in a second segment of the plurality of physical segments of the SSD, wherein the second physical location index is unique to the second segment.

4. The system of claim 3, wherein the SSD does not include a hierarchy of pointers to data blocks on the SSD.

5. The system of claim 1, wherein the memory includes further instructions stored thereon to cause the system to generate the first checksum from the first data block.

6. The system of claim 1, wherein the memory includes further instructions stored thereon to cause the system to set another bit in the first bitset to map the first data block with a second snapshot identifier in included in the vector of snapshots.

7. The system of claim 1, wherein the memory includes further instructions stored thereon to cause the system to update the first bitset to associate the first data block with a second snapshot identifier included in the vector of snapshot identifiers instead of the first snapshot identifier.

8. The system of claim 1, wherein the memory includes further instructions stored thereon to cause the system to maintain counters of snapshot identifiers across data block pointers.

9. The system of claim 2, wherein the first dataset corresponds to a first snapshot and the second dataset corresponds to a second snapshot deduplicated from the first snapshot.

10. A system comprising:
    a processor coupled to a solid state storage device (SSD); and
    a non-transitory computer-readable medium having instructions for a sequential filesystem stored thereon, the instructions executable by the processor to cause the system to:
    generate data block pointers as metadata for data blocks of a file, wherein each data block pointer includes a physical location index, a checksum for the corresponding data block, and a bitset to indicate associations with snapshots;
    for each of the data blocks associated with a snapshot, set a bit at a position in the bitset mapping to a snapshot identifier associated with the snapshot, wherein the snapshot identifier is included in a vector of snapshot identifiers;

successively store the data blocks and data block pointers sequentially into segments of the SSD, wherein the physical location index of each data block pointer corresponds uniquely to a segment; and store the vector of snapshot identifiers in a checkpoint marker on the SSD during a checkpoint of the segment.

11. The system of claim 10, wherein the non-transitory computer-readable medium further comprises instructions to maintain the vector of snapshot identifiers.

12. The system of claim 10, wherein the non-transitory computer-readable medium further comprises instructions to maintain counters of the data block pointers.

13. The system of claim 11, wherein the non-transitory computer-readable medium further comprises instructions to maintain counters of snapshot identifiers across the data block pointers.

14. The system of claim 10, wherein a same file type is associated a most recent snapshot identifier.

15. The system of claim 14, wherein the SSD does not include a hierarchy of pointers to the data blocks on the SSD.

16. A non-transitory computer-readable medium having instructions for a linear filesystem stored thereon, the instructions to:

generate a first data pointer as metadata that includes a first physical location index, a first checksum, and a first bitset, based on a first request to write a first data block to a solid state storage device (SSD), wherein the first checksum corresponds to the first data block;

set a bit in the first bitset that maps to a first snapshot identifier included within a vector of snapshot identifiers, wherein the first snapshot identifier is associated with the first data block of a first snapshot;

store the first data pointer sequentially with the first data block in a first segment of a plurality of physical segments of the SSD, wherein the first physical location index is unique to the first segment; and store the vector of snapshot identifiers in a checkpoint marker on the SSD during a checkpoint of the segment.

17. The non-transitory computer-readable medium of claim 16 further comprising instructions to:

build a first hash tree from checksums retrieved from data blocks associated with the first snapshot identifier; and compare the first hash tree to a second hash tree associated with a second snapshot to deduplicate data blocks between the first snapshot and the second snapshot.

18. The non-transitory computer-readable medium of claim 16, wherein positions in the bitset map to a plurality of snapshot identifiers.

19. The non-transitory computer-readable medium of claim 16, further comprising instructions to maintain a counter for the first data block.

* * * * *